United States Patent
Guermoud et al.

(10) Patent No.: US 10,298,897 B2
(45) Date of Patent: May 21, 2019

(54) METHOD OF PROCESSING A VIDEO CONTENT ALLOWING THE ADAPTATION TO SEVERAL TYPES OF DISPLAY DEVICES

(75) Inventors: Hassane Guermoud, Cesson Sevigne (FR); Jurgen Stauder, Montreuil/Ille (FR); Laurent Blonde, Thorigne-Fouillard (FR)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 658 days.

(21) Appl. No.: 13/977,072

(22) PCT Filed: Dec. 28, 2011

(86) PCT No.: PCT/EP2011/074148
§ 371 (c)(1),
(2), (4) Date: Jun. 28, 2013

(87) PCT Pub. No.: WO2012/089766
PCT Pub. Date: Jul. 5, 2012

(65) Prior Publication Data
US 2013/0286286 A1    Oct. 31, 2013

(30) Foreign Application Priority Data
Dec. 30, 2010  (FR) ..................... 10 61376

(51) Int. Cl.
*H04N 9/68* (2006.01)
*G06F 3/14* (2006.01)
(Continued)

(52) U.S. Cl.
CPC .............. *H04N 9/68* (2013.01); *G06F 3/14* (2013.01); *G09G 5/02* (2013.01); *H04N 9/67* (2013.01);
(Continued)

(58) Field of Classification Search
None
See application file for complete search history.

(56) References Cited

U.S. PATENT DOCUMENTS 7,633,646 B2    12/2009  Ichitani
2002/0118380 A1   8/2002  Krueger et al.
(Continued)

FOREIGN PATENT DOCUMENTS

CN    1697513    11/2005
CN    1856115    11/2006
(Continued)

OTHER PUBLICATIONS

Reinhard et al, "Color Transfer between Images", IEEE Computer Graphics and Applications, pp. 34-41, 2001.*
(Continued)

*Primary Examiner* — Kee M Tung
*Assistant Examiner* — Patrick F Valdez
(74) *Attorney, Agent, or Firm* — Lily Neff

(57) ABSTRACT

Method wherein each image of the content is transformed using at least one pre-transformed image which is associated with a key image of this content wherein, from each key image and an associated pre-transformed image, a color transform is derived, and wherein each color transform is applied to a selection of images of this content which is associated with said key image. Applied to a content broadcast system comprising a server and a receiver to which are connected several types of display devices, the invention advantageously makes it possible to adapt the content to these different types.

8 Claims, 4 Drawing Sheets

(51) Int. Cl.
*G09G 5/02* (2006.01)
*H04N 9/67* (2006.01)
*H04N 21/2343* (2011.01)
*H04N 21/258* (2011.01)

(52) U.S. Cl.
CPC ........... *H04N 21/234327* (2013.01); *H04N 21/25825* (2013.01); *G09G 2340/06* (2013.01); *G09G 2370/042* (2013.01)

(56) References Cited

U.S. PATENT DOCUMENTS

| | | |
|---|---|---|
| 2003/0002748 A1 | 1/2003 | Funahashi |
| 2005/0093981 A1* | 5/2005 | Nonaka ............ H04N 21/2343 348/207.99 |
| 2005/0134801 A1 | 6/2005 | Bogdanowicz et al. |
| 2005/0264693 A1 | 12/2005 | Kondo et al. |
| 2006/0117040 A1* | 6/2006 | Begeja ............ G06F 17/30828 |
| 2006/0149401 A1* | 7/2006 | Chung ............... H04L 12/2803 700/94 |
| 2006/0164557 A1* | 7/2006 | Fukuda ............... H04N 9/3182 348/650 |
| 2006/0232717 A1 | 10/2006 | Kervec et al. |
| 2008/0195977 A1 | 8/2008 | Carroll et al. |
| 2009/0109344 A1* | 4/2009 | Ollivier ................ H04N 9/68 348/708 |
| 2009/0231355 A1* | 9/2009 | Perronnin ............. G09G 5/06 345/594 |
| 2009/0257652 A1* | 10/2009 | Liu .................... H04N 9/73 382/167 |
| 2009/0282443 A1* | 11/2009 | Kim .................. H04N 7/17318 725/88 |
| 2011/0091025 A1* | 4/2011 | Francisco .......... H04L 12/2834 379/93.02 |
| 2011/0154426 A1* | 6/2011 | Doser ................. H04N 1/6088 725/118 |
| 2011/0268178 A1* | 11/2011 | Park ................ H04N 21/23439 375/240.02 |

FOREIGN PATENT DOCUMENTS

| | | | |
|---|---|---|---|
| EP | 1648158 A1 * | 4/2006 | ............ G06T 5/009 |
| EP | 1845704 | 10/2007 | |
| GB | 2360895 | 10/2001 | |
| WO | WO 2008000805 A1 * | 1/2008 | ............ G11B 27/034 |
| WO | WO 2008074785 A1 * | 6/2008 | ............. H04N 9/646 |
| WO | WO2008085150 | 7/2008 | |
| WO | WO2008100946 | 8/2008 | |
| WO | WO2010021705 | 2/2010 | |
| WO | WO 2011159617 A1 * | 12/2011 | ............. H04N 1/603 |

OTHER PUBLICATIONS

Wang et al, "An Effective Algorithm for Image Sequence Color Transfer", Mathematical and Computer Modelling 44, 2006.*
Wang et al, "An effective algorithm for image sequence color transfer", Mathematical and Computer Modelling, vol. 44, pp. 608-627, 2006.*
Farbman et al, "Tonal Stabilization of Video", ACM Trans. on Graphics, 30(4), Article 89, Jul. 2011.*
Schallauer et al, "Automatic Restoration Algorithms for 35mm Film", J. of Computer Vision Research, 1(3), pp. 60-85, The MIT Press, 1999.*
An et al, "User-Controllable Color Transfer", Eurographics 2010, 29(2), 2010.*

* cited by examiner

METHOD OF PROCESSING A VIDEO CONTENT ALLOWING THE ADAPTATION TO SEVERAL TYPES OF DISPLAY DEVICES

This application claims the benefit, under 35 U. § 365 of International Application PCT/EP2011/074148, filed Dec. 28, 2011, winch was published. In accordance with PCT Article 21(2) on Jul. 5, 2012 in French and which claims the benefit of French patent application No. 1061376, filed on Dec. 30, 2010.

The invention relates notably to the adaptation of video contents to a given type of video display device.

The image display devices comprise, notably, plasma display panels (PDPs), liquid crystal displays (LCDs) and video projectors. There are also different types of PDP, and different types of LCD, being differentiated by different display characteristics. Among these display characteristics are, notably, colorimetric characteristics, such as the color gamut which a display device is capable of reproducing.

In order to obtain an almost identical reproduction of a given video content on different types of image display devices, it is necessary first to adapt this video content to the type of image display device on which it is intended to display it. For this purpose of adaptation, document WO2008/085150 describes a system for broadcasting video content as shown in FIG. 1 comprising on one side a video content storage platform connected to a video-on-demand (VOD) server, and, on the other side, a home decoder connected to an image display device. This system also comprises transmission means capable of transmitting video contents from the server to the decoder. These transmission means can be for example wired, such as an ADSL link or a fiber optic, or can be for example terrestrial.

According to the method of transmission described in document WO2008/085150, different versions Film_V1, Film_V2, Film_V3, . . . , of a same base video content Film_V0 are prepared on the server side, each version being adapted to a predetermined type of image display device. The decoder is adapted for recognizing the type of image display device to which it is connected, and for transmitting this information to the server in such a way that the server can select and transmit to the decoder the version of the video content which corresponds to the type of image display device connected to the decoder. It is thus possible to obtain on different types of display device an almost identical display of a given video content.

Various methods are known for adapting a given video content to a given image display device. Such methods are for example called "color grading", or "color correction", or, more generally "mastering". The adaptation of the video content can be shown by a "color transform" or a "tone map".

One disadvantage posed by the system and method for transmitting video content which has been described is that it requires the preparation and storage of a large number of different versions of a same video content, which requires significant and costly processing and storage resources.

To avoid this disadvantage, document EP1845704 (SHARP) describes a system and method of transmission where, instead of storing different versions of a same video content on the server side, we simply store different "color transforms" Tr_1, Tr_2, Tr_3, . . . which, by application to a base video content Film_V0 to be transmitted, makes it possible to obtain the different versions Film_V1, Film_V2, Film_V3, . . . previously described. As previously, the decoder is adapted for recognizing the type of image display device to which it is connected, and for transmitting this information to the server in such a way that the server can select and transmit to the decoder the "color transform" which corresponds to the type of image display device connected to the decoder. After reception of the base video content Film_V0 and of this "color transform", the decoder processes the base video content using this "color transform" to create, for example in real time, the version of the video content which is adapted to the image display device. It is thus possible to obtain on different types of image display devices an almost identical display of a given video content.

The documents US2002118380 (XEROX) and US2005134801 (KODAK) describe variants of this method and/or other means of transmitting a "color transform".

One disadvantage posed by this method of transmission of video content which has been described is that it requires a significant processing power on the decoder or image display device side. Another disadvantage is that the same color transform is used for all video content displayed on the same display device.

One purpose of the invention is a better compromise between the two aforementioned disadvantages.

To this end, the purpose of the invention is a method for processing a video content comprising a temporal succession of base images using at least one pre-transformed image which is associated with one of said base images, each base image with which is associated at least one pre-transformed image being called a "key image", wherein each pre-transformed image represents a color transformation of said associated key image, said method comprising the steps wherein:

from each key image and an associated pre-transformed image, a color transform is derived capable of transforming said key image into said pre-transformed image, with each key image, a selection of base images are associated which are different from said the key image, each color transform is applied to each of the base images of the selection of base images which is associated with said key image, so as to obtain transformed images.

According to the invention, each pre-transformed image associated with a key image coincides with the image which would be obtained by application to this key image of the color transform derived, as indicated above, from this key image and this pre-transformed image.

Preferably, each key image is associated with a plurality of pre-transformed images.

Preferably, the method is adapted for displaying said video content using different types of display devices, and each pre-transformed image of said plurality represents a transformation of said key image which is adapted to displaying said key image by one of said types of display device.

Preferably, the method also comprises the steps wherein:
at least one type of display device is identified with which it is desired to display said video content,
in order to perform said derivation of color transform from each key image, the pre-transformed image to be associated with said key image is selected beforehand according to said identified type of display device.

When with each key image there is associated a plurality of pre-transformed images, the pre-transformed image is selected from among this plurality.

The purpose of the invention is also a method for displaying a video content using a display device of a predetermined type, comprising a processing of the video content according to the invention, and a step of displaying the transformed images and the at least one pre-transformed image which is selected, in the same temporal order of succession as that of the corresponding base images of the video content.

The purpose of the invention is also a video content receiver capable of being connected to a server and to at least one image display device comprising means for:
- receiving a video content comprising a temporal succession of images;
- identifying the type $T_i$, $T_k$ of each display device to which this receiver is connected;
- transmitting the corresponding information for identification of this type to the server;
- detecting, among the images of the received video content, images called key images, and, with each key image detected, an associated pre-transformed image for each identified type of display device;
- deriving from each pair formed by a key image $Im\_K_j$ and by an associated pre-transformed image $Im\_V_{ji}$, a color transform $Tr_{ji}$ capable of transforming this key image into this pre-transformed image and applicable to any other image of the received video content;
- receiving, with the video content, information which makes it possible to select, for each key image detected, the other images of the video content to be transformed in the same way as this key image is transformed into one of the associated pre-transformed images;
- in connection with the detection of each key image $Im\_K_j$, and using said information received with the video content, perform in the video content a selection of images to be transformed using the at least one color transform derived from a pair comprising said key image;
- applying each color transform to the images selected in connection with the key image $Im\_K_j$ comprised in the pair from which is derived this color transform;
- sending to each display device connected to the receiver a modified video content comprising the pre-transformed images which are associated with the identified type $T_i$, $T_k$ of said display device and comprising transformed images obtained by the application of color transforms derived from pairs comprising said pre-transformed images, in the same temporal order of succession as that of the corresponding images of the received video content.

This receiver can notably be a decoder. This decoder can be integrated in a display device.

One advantage of the invention is that only one version of a film is stored on the transmission side, with only a limited number of pre-transformed images. The invention makes it possible to only have to prepare these pre-transformed images instead of different complete versions of the video content.

One advantage of the invention is also being compatible with receivers which are not adapted to detect the key images and pre-transformed images in the transmitted stream.

In summary, the purpose of the invention is a method for processing a video content enabling adaptation to several types of display devices, wherein each image of the content is transformed using at least one pre-transformed image which is associated with a key image of this content wherein, from each key image and an associated pre-transformed image, a color transform is derived, and wherein each color transform is applied to a selection of images of this content which is associated with said key image.

Applied to a content broadcast system comprising a server and a receiver to which are connected several types of display devices, the invention advantageously makes it possible to adapt the content to these different types.

The invention will be better understood upon reading the following description, provided as a non-restrictive example and referring to the annexed drawings wherein:

FIG. 1, already described, shows a video content broadcast system of the prior art;

Figure 1:
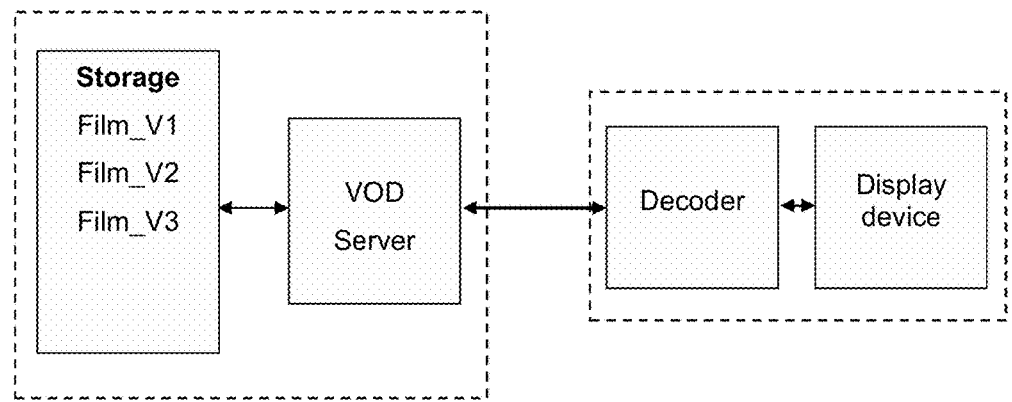
Figure 2:
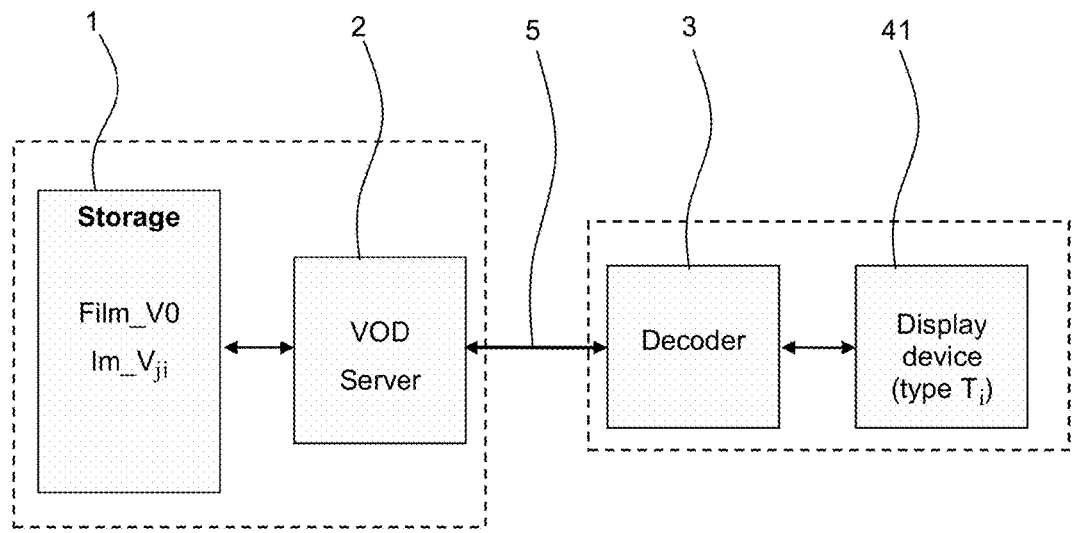
FIG. 2 shows a video content broadcast system capable of implementing the invention according to a first embodiment.

FIG. 2 shows a video broadcast system capable of implementing a first embodiment of the invention. This system comprises on one side a storage platform 1 for a video content Film_V0T connected to a video-on-demand (VOD) server 2, and, on the other side, a home decoder 3 connected to an image display device 41 of type $T_i$. As previously, this system also comprises transmission means 5 capable of transmitting video contents from the server 2 to the decoder 3.

The decoder 3 is adapted for:
- receiving a video content from the server 2 via the transmission means 5;
- detecting, in the received video content, key images and, with each key image, an associated pre-transformed image;
- identifying the type $T_i$ of the display device 41 to which the decoder is connected and transmitting the corresponding identification information to the server 2; this identification can notably use the standard known as EDID;
- deriving, from each pair formed by a key image and by its associated pre-transformed image, a color transform capable of transforming this key image into this pre-transformed image and applicable to any other image of the video content;
- in connection with the detection of each key image, and using information received with the video content, performing a selection of the images of the video content to be transformed using each color transform;
- applying each derived color transform to these selected images;
- sending to the display device 41 connected to the decoder 2 a modified video content comprising the pre-transformed images and the transformed images obtained by the application of the color transform derived from the pairs comprising these pre-transformed images, in the same temporal order of succession as that of the corresponding images of the received video content.

The server 2 is adapted for:
- receiving, from the decoder 3 via the transmission means 5, an information item for identification of type of image display device;
- selecting, from among a plurality of pre-transformed images associated with any key image included in a video content, the pre-transformed image of this plurality which is adapted to displaying this key image using an image display device of a type corresponding to a received identification information item;

inserting into the video content the selected pre-transformed images.

sending this video content to the decoder 2 via the transmission means 5;

sending with the video content selection information which makes it possible to select, for each key image included in the video content, the images of the video content to be transformed in the same way as this key image is transformed into one of the associated pre-transformed images.

For the implementation of the method according to a first embodiment of the invention, the base video content Film_$V_0$ is first prepared as follows.

From among the images of the base video content, M key images Im_$K_1$, Im_$K_2$, Im_$K_j$, . . . , Im_$K_M$ are selected. The selection of the key images can be arbitrary: they can be uniformly distributed in the base video content, for example one key image every 1000 images. It is possible instead to choose a key image in each scene of the video content, in such a way that it is representative as far as possible of the colors used in this scene.

With each key image Im_$K_j$ of the base video content, a plurality of N versions called pre-transformed versions Im_$V_{j1}$, Im_$V_{j2}$, . . . , Im_$V_{ji}$, . . . , Im_$V_{jN}$ is then prepared from this same key image, each version Im_$V_{ji}$ of this same key image Im_$K_j$ being adapted to a corresponding type $T_i$ of image display device. This preparation is carried out in an analogous manner to that of the different versions of a same video content, as described in the prior art. Thus, with each key image Im_$K_j$, is associated a plurality of N images called pre-transformed images Im_$V_{j1}$, Im_$V_{j2}$, . . . , Im_$V_{ji}$, . . . , Im_$V_{jN}$.

With each image Im_$K_j$, there is then also associated a selection of images of the video content to be transformed in the same way as this key image Im_$K_j$ is transformed into one of the associated pre-transformed images; this selection does not generally comprise the key image itself; this selection concerns for example all images comprised between this key image Im_$K_j$ and the following key image Im_$K_{j+1}$. In the case of key images representative of the colors of a scene as previously described, this selection preferably relates to all the images of this same scene.

The selection of the key images in the content and the selection of the other images of the content to be associated with a key image are subject to, in a manner known in itself, an indexing of each image of the content.

On the storage platform 1, the video content whose images are thus indexed and the M×N pre-transformed images Im_$V_{j=1\ to\ M;\ i=1\ to\ N}$ are therefore stored. Thus, instead of storing on the storage platform, as in the prior art, N different versions Film_$V_{i=1\ to\ N}$ of the same base video content Film_$V_0$, only N×M pre-transformed image are prepared and stored, which requires far fewer preparation and storage resources. Advantageously, for each key image Im_$K_j$, a series of N pre-transformed images Im_$V_{j1}$, Im_$V_{j2}$, . . . , Im_$V_{ji}$, . . . , Im_$V_{jN}$ adapted respectively to a type $T_1$, $T_2$, . . . , $T_i$, . . . , $T_N$ of image display device is directly prepared, without using the different complete video content versions.

The decoder 3 identifies the type $T_i$ of image display device to which it is connected, and transmits this identification information to the server 2 via the transmission means 5. Using this identification information, for each key image Im_$K_j$, the server 2 selects, from among the plurality of pre-transformed images Im_$V_{j1}$, Im_$V_{j2}$, . . . , Im_$V_{ji}$, . . . , Im_$V_{jN}$ associated with this key image, the pre-transformed image Im_$V_{ji}$ of this plurality which is adapted to displaying this key image Im_$K_j$ using this type $T_i$ of device. For a type $T_i$ of image display device, the selection of M pre-transformed images Im_$V_{j=1\ to\ M;\ i}$ is therefore obtained overall.

Figure 3:
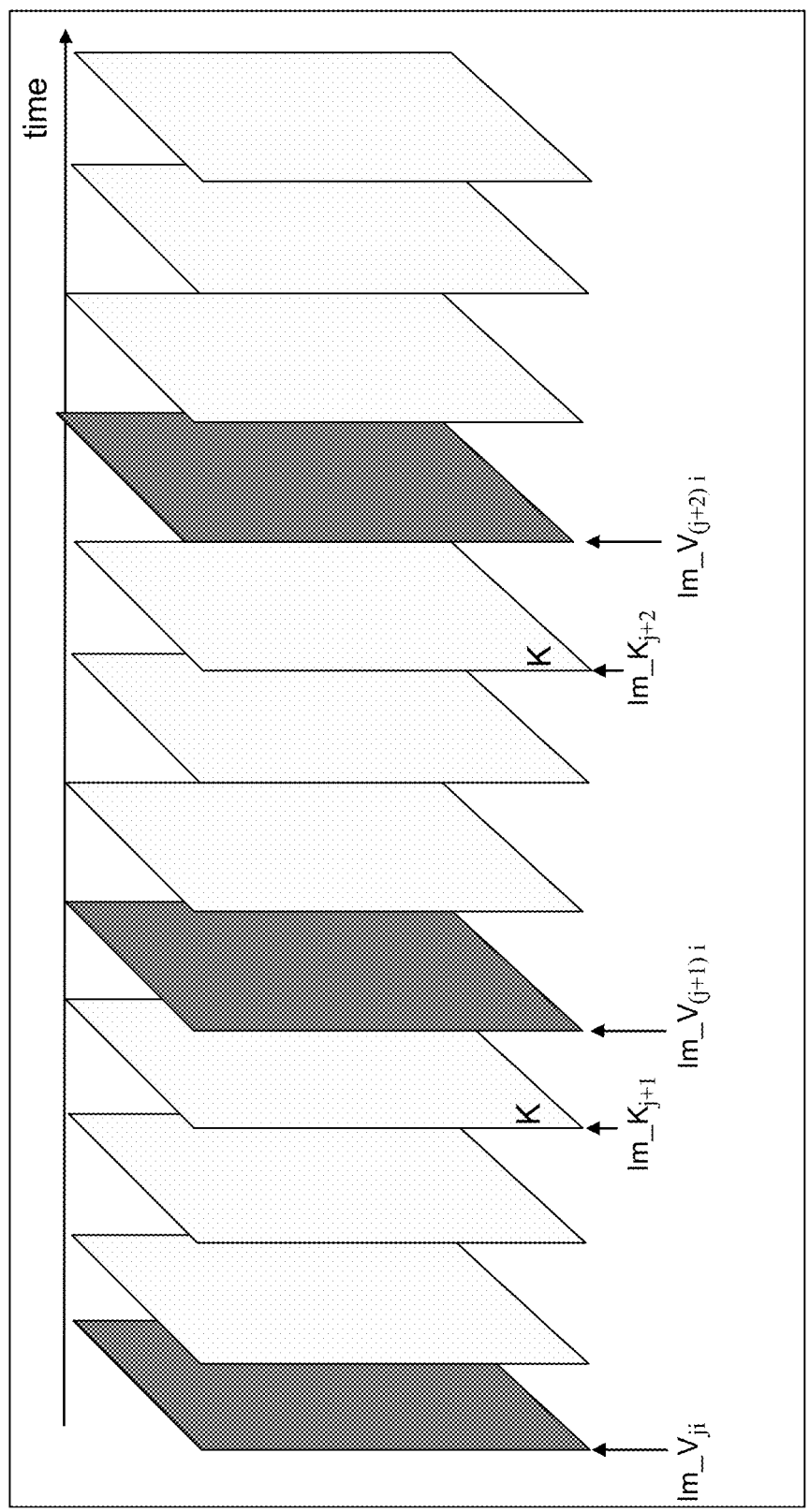
FIG. 3 shows a video content modified by the server 2 of the system of FIG. 2, comprising unmodified base images among which some are indexed as key images, and pre-transformed images selected by the server 2.

Then, before transmitting the video content Film_$V0$ to the decoder 3, the server modifies this content by inserting the M pre-transformed images Im_$V_{j=1\ to\ M;\ i}$. This insertion into the video content is preferably carried out in such a way that each pre-transformed image Im_$V_{ji}$ replaces an image immediately adjacent to the associated key image Im_$K_j$, preferably an image which immediately follows this key image. The video content as described in FIG. 3 is thus obtained. This video content therefore comprises unmodified base images among which some are indexed "K" as key images, and pre-transformed images which are selected by the server 2, as described previously.

Using the transmission means 5, the server 2 then transmits to the decoder 3 the modified video content with the stored selection information previously described which makes it possible to select, for each key image, the images of the video content to be transformed in the same way as this key image is transformed into its associated pre-transformed image.

The decoder 3 receives the modified video content and this selection information.

From each key image Im_$K_j$ and from the associated pre-transformed image Im_$V_{ji}$, the decoder derives, for example as described below, a color transform $Tr_{ji}$ capable of transforming this key image Im_$K_j$ into this selected pre-transformed image Im_$V_{ji}$.

For the derivation of the color transform from this pair of images formed from a key image and the associated selected pre-transformed image, it is possible for example to proceed as follows:

Pairs of corresponding colors are constructed between the key image and the pre-transformed image, each color pair being formed from the color of a pixel of the key image in a color space of the video content, represented for example by trichromatic coordinates X,Y,Z in a CIE-XYZ visual color space, and from the color of the same pixel in the pre-transformed image in a color space of the image display device of type $T_i$, represented for example by trichromatic coordinates R,G,B in the linear color space of the image display device of type $T_i$;

A look up table is thus obtained, with, as input values, the colors of the key image, and, as output values, the colors of the pre-transformed image.

Using the input values of this table, input tetrahedra are formed in the color space of the video content in such a way that the four vertices of each tetrahedron correspond to four adjacent input values in this space, and the corresponding output tetrahedra are formed in the color space of the display device in such a way that the four vertices of each tetrahedron correspond to four adjacent output values in this space; thus, the look up table enables each input tetrahedron to be matched with an output tetrahedron.

With each key image Im_$K_j$, using the information transmitted with the video content, the decoder associates a selection of images of the content video, different from the key image Im_$K_j$, which are to be transformed in the same way as this key image is transformed into its selected pre-transformed image. For each key image Im_$K_j$, the decoder applies, for example as described below, the derived color transform $Tr_{ji}$ to each of the images of the selection which is associated with this key image; transformed images are thus obtained. The color transform which is derived from the image pair formed from a key image $Im\_K_j$ and from the associated selected pre-transformed image $Im\_V_{ji}$ then operates as follows, to pass from an image to be transformed to a transformed image:

For each pixel of an image to be transformed, or input pixel, the input tetrahedron of the color space of the video content to which the color of this pixel belongs is identified in a manner known in itself: the vertices of this tetrahedron are for example represented by the following trichromatic coordinates: $X_0Y_0Z_0$, $X_1Y_1Z_1$, $X_2Y_2Z_2$, $X_3Y_3Z_3$;

Using the previously described look up table which defines the color transform $Tr_{ji}$, a search is made for the output tetrahedron corresponding to the input tetrahedron which has been identified; the vertices of this tetrahedron are for example represented by the following trichromatric coordinates: $R_0G_0B_0$, $R_1G_1B_1$, $R_2G_2B_2$, $R_3G_3B_3$;

A determinant DET is calculated according to the formula:

$$DET = \begin{vmatrix} a_{XYZ} & b_{XYZ} & c_{XYZ} \\ a'_{XYZ} & b'_{XYZ} & c'_{XYZ} \\ a''_{XYZ} & b''_{XYZ} & c''_{XYZ} \end{vmatrix}$$

where:

$a_{XYZ}=X_1-X_0, a_{XYZ}'=Y_1-Y_0, a_{XYZ}''=Z_1-Z_0$ $b_{XYZ}=X_2-X_0, b_{XYZ}'=Y_2-Y_0, b_{XYZ}''=Z_2-Z_0$ $c_{XYZ}=X_3-X_0, c_{XYZ}'=Y_3-Y_0, c_{XYZ}''=Z_3-Z_0$

The following coefficients are then calculated:

$$u_s = \frac{\begin{vmatrix} d_{XYZ} & b_{XYZ} & c_{XYZ} \\ d'_{XYZ} & b'_{XYZ} & c'_{XYZ} \\ d''_{XYZ} & b''_{XYZ} & c''_{XYZ} \end{vmatrix}}{DET},$$

$$v_s = \frac{\begin{vmatrix} a_{XYZ} & d_{XYZ} & c_{XYZ} \\ a'_{XYZ} & d'_{XYZ} & c'_{XYZ} \\ a''_{XYZ} & d''_{XYZ} & c''_{XYZ} \end{vmatrix}}{DET},$$

$$w_s = \frac{\begin{vmatrix} a_{XYZ} & b_{XYZ} & d_{XYZ} \\ a'_{XYZ} & b'_{XYZ} & d'_{XYZ} \\ a''_{XYZ} & b''_{XYZ} & d''_{XYZ} \end{vmatrix}}{DET}$$

where $d_{XYZ}=X_s-X_0, d_{XYZ}'=Y_s-Y_0, d_{XYZ}''Z_s-Z_0$

The trichromatric coordinates $R_sG_sB_s$ of the color of the pixel of the transformed image, which corresponds to the input pixel of the image to be transformed, are then obtained according to the formulas:

$R_s=a_{RGB}u_s+b_{RGB}v_s+c_{RGB}w_s+R_0$ $G_s=a_{RGB}'u_s+b_{RGB}'v_s+c_{RGB}'w_s+G_0$ $B_s=a_{RGB}''u_s+b_{RGB}''v_s+c_{RGB}''w_s+B_0$ where:

$a_{RGB}=R_1-R_0, a_{RGB}'=G_1-G_0, a_{RGB}''=B_1-B_0$ $b_{RGB}=R_2-R_0, b_{RGB}'=G_2-G_0, b_{RGB}''=B_2-B_0$ $c_{RGB}=R_3-R_0, c_{RGB}'=G_3-G_0, c_{RGB}''=B_3-B_0$

By applying this method to each of the images of the video content of the selection which is associated with a key image $Im\_K_j$, a series of transformed images is thus obtained. By proceeding in the same way for each key image, a series of transformed images for each key image is thus obtained.

Any other method capable of deriving a color transform from a pair formed by an input image and an output image can be used without departing from the invention.

By joining together all the transformed images obtained and the pre-transformed images $Im\_V_{j=1 \, to \, M; \, i}$ in the same temporal order of succession as that of the corresponding images of the initial video content, a modified version of the video content is obtained, on the decoder side, which is adapted to display the video content correctly on the display device of type $T_i$ connected to the decoder. This modified version is very close to the corresponding version $Film\_V_i$ used in the prior art, as previously described.

The decoder then sends to the display device this modified version of the video content in order to obtain the display of this video content.

Regardless of the type of image display device connected to the decoder, it is possible, thanks to the invention, to obtain an almost identical display of a given video content, with limited content preparation and storage resources, notably on the server side. In addition, the insertion of pre-transformed images into the transmission of the video content to the decoder makes it possible to continuously adapt the transformation of the colors for the display. Thus, the transformation of the colors can be specifically adapted to each scene of the content video, according to, notably, the color palette specific to each scene.

Another advantage of the invention is that a decoder which would not have means for identifying the pairs each formed from a key image and from a pre-transformed image could nevertheless provide a displayable video content to the image display device to which it is connected, since the insertion of pre-transformed images into the video content transmitted to the decoder would only slightly disrupt viewing.

Figure 4:
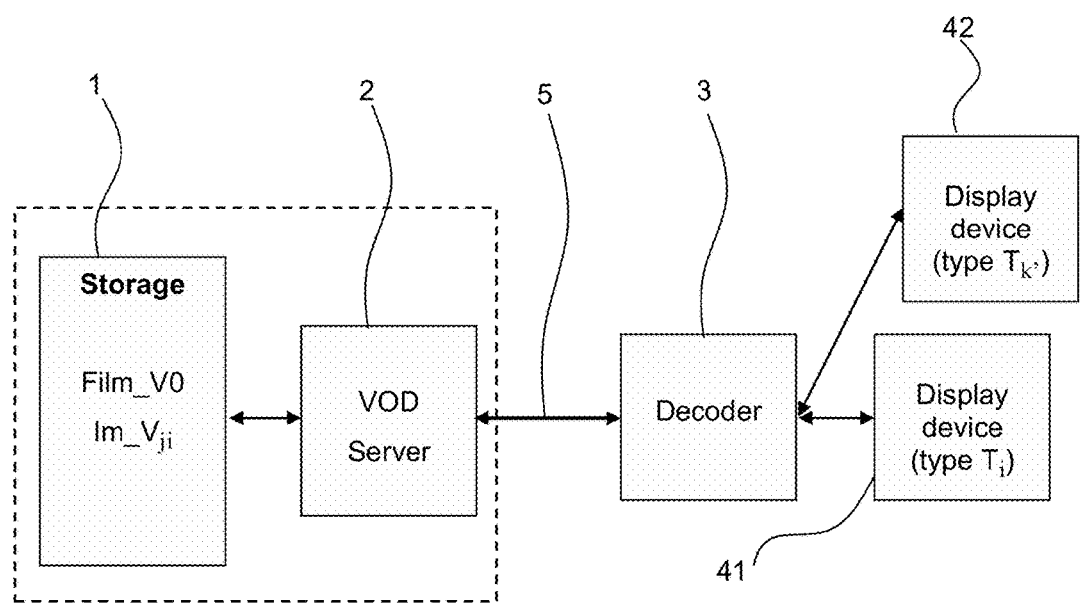
FIG. 4 shows a video content broadcast system capable of implementing the invention according to a second embodiment.

FIG. 4 shows a video broadcast system capable of implementing a second embodiment of the invention. This system is identical to the preceding system with the essential difference that it also comprises a second image display device 42 of type $T_k$ connected to the same decoder 3, this type $T_k$ being different from the type $T_i$ of the device 41.

The decoder 3, also identical, is notably also adapted for:
identifying the type $T_i$, $T_k$ of each display device 41, 42 to which the decoder 3 is connected;
transmitting the corresponding information for identification of this type to the server (2);
detecting, with each key image detected, an associated pre-transformed image for each identified type $T_i$; $T_k$ of display device;
sending, to each display device 41, 42 connected to the decoder 3, a modified video content comprising the pre-transformed images which are associated with the identified type $T_i$, $T_k$ of this display device 41, 42 and comprising the transformed images obtained by the application of the color transform derived from pairs comprising these pre-transformed images, in the same temporal order of succession as that of the corresponding images of the received video content.

The server 2, also identical, is notably also adapted for:
receiving, from the decoder 3 via the transmission means 5, an information item for identification of each type $T_i$, $T_k$ of display device 41, 42;
selecting, from among a plurality of pre-transformed images associated with any key image included in a video content, the pre-transformed images of this plurality which are adapted to displaying this key image using display devices of type $T_i$, $T_k$ corresponding to the received identification information items.

For the implementation of the method according to a second embodiment of the invention, the base video content Film_$V_0$ is first prepared as previously. On the storage platform 1, the video content whose images are indexed and the M×N pre-transformed images Im_$V_{j=1 \text{ to } M;\ i=1 \text{ to } N}$ are therefore stored as previously. The decoder 3 then identifies the type $T_i$, $T_k$ of image display devices to which it is connected, and transmits this identification information to the server 2 via the transmission means 5. Using this identification information, for each key image Im_$K_j$, the server 2 selects, from among the plurality of pre-transformed images Im_$V_{j1}$, Im_$V_{j2}$, ..., Im_$V_{ji}$, ..., Im_$V_{jN}$ associated with this key image, the pre-transformed images Im_$V_{ji}$, Im_$V_{jk}$ of this plurality which are adapted to displaying this key image Im_$K_j$ using respectively the type $T_i$ and the type $T_k$ of display device. For a type $T_i$, $T_k$ of image display device, the selection of 2×M pre-transformed images Im_$V_{j=1 \text{ to } M;\ i}$, Im_$V_{j=1 \text{ to } M;\ k}$ is therefore obtained overall.

Figure 5:
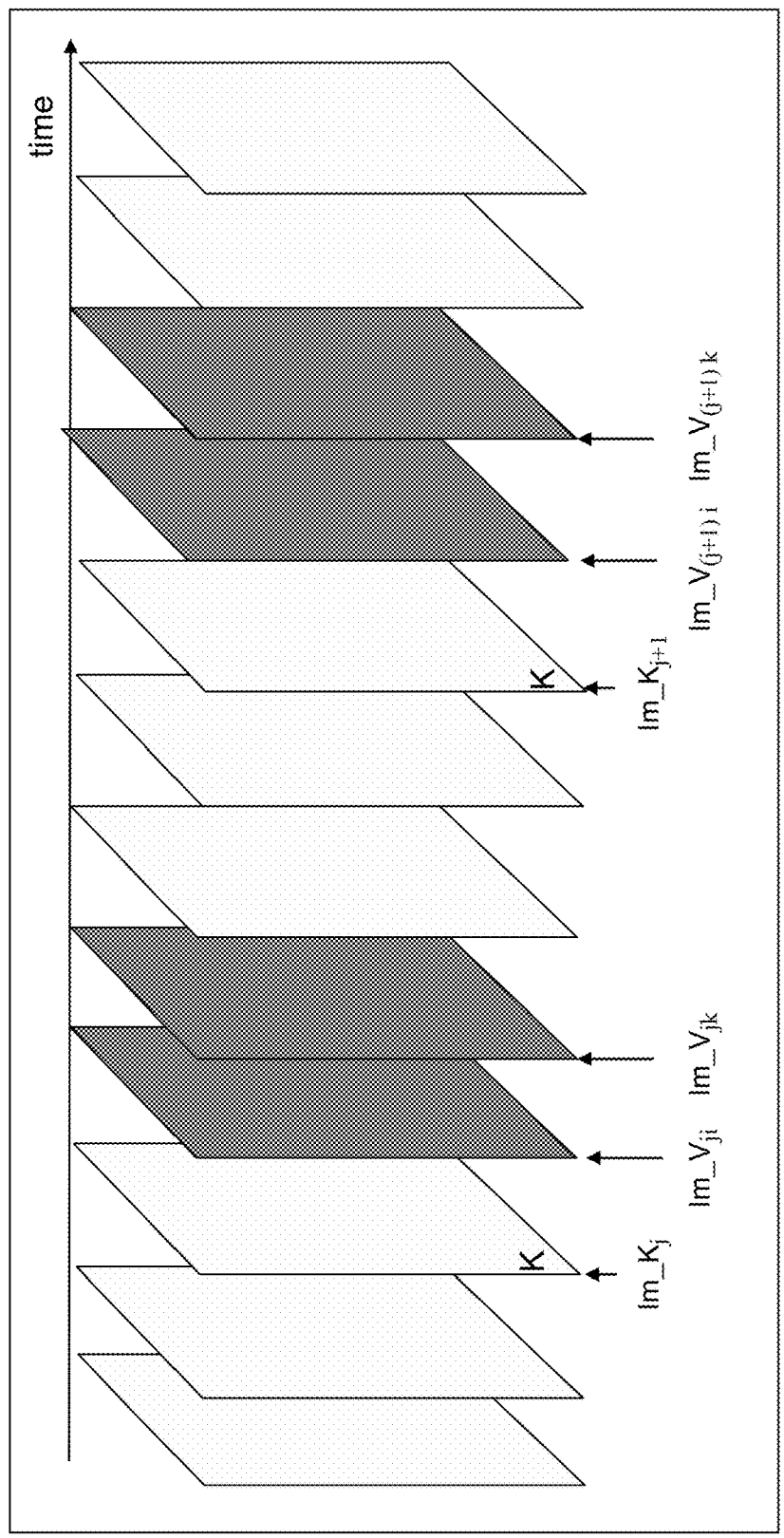
FIG. 5 shows a video content modified by the server 2 of the system of FIG. 4, comprising unmodified base images among which some are indexed as key images, and pre-transformed images selected by the server 2.

Then, before transmitting the video content Film_V0 to the decoder 3, the server modifies this content by inserting the 2×M pre-transformed images Im_$V_{i=1 \text{ to } M;\ i}$, Im_$V_{j=1 \text{ to } M;\ k}$. This insertion into the video content is preferably carried out in such a way that each pair of pre-transformed images Im_$V_{ji}$, Im_$V_{jk}$ replaces a pair of images immediately adjacent to the associated key image Im_$K_j$, preferably a pair of images which immediately follow this key image. The video content as described in FIG. 5 is thus obtained.

Using the transmission means 5, the server 2 then transmits to the decoder 3 the modified video content with the stored selection information previously described which makes it possible to select, for each key image, the images of the video content to be transformed in the same way as this key image is transformed into one and the other associated pre-transformed images.

The decoder 3 receives the modified video content and this selection information, and has information for identification of types $T_i$, $T_k$ of connected display devices 41, 42.

From each pair comprising a key image Im_$K_j$ and one of the associated pre-transformed images Im_$V_{ji}$, Im_$V_{jk}$, the decoder derives, as previously, a color transform $Tr_{ji}$, $Tr_{jk}$ capable of transforming this key image Im_$K_j$ into this pre-transformed image.

With each key image Im_$K_j$, using the information transmitted with the video content, the decoder associates a selection of images of the content video, different from the key image Im_$K_j$, which are to be transformed in the same way as this key image is transformed into its selected pre-transformed image. For each key image Im_$K_j$, the decoder applies, as previously, the derived color transforms $Tr_{ji}$, $Tr_{ik}$ to each of the images of the selection which is associated with this key image; transformed images are thus obtained.

The decoder 3 then sends to each display device 41, 42 a specific modified video content which comprises the pre-transformed images which are associated with the identified type $T_i$, $T_k$ of this display device and the transformed images obtained by the application of color transforms derived from pairs comprising these pre-transformed images, in the same temporal order of succession as that of the corresponding images of the video content received by the decoder 3.

The invention applies similarly to the cases where more than two image display devices are connected to the same decoder 3.

The invention applies similarly to the cases where several decoders are connected to the same server 2 by the transmission means 5, or by different means.

Regardless of the type of image display device connected to the decoder, it is possible, thanks to the invention, to obtain an almost identical display of a given video content, with limited content preparation and storage resources, notably on the server side. In addition, the insertion of pre-transformed images into the transmission of the video content to the decoder makes it possible to continuously adapt the transformation of the colors for the display. Thus, the transformation of the colors can be specifically adapted to each scene of the video content, according to, notably, the color palette specific to each scene.

Another advantage of the invention is that a decoder which would not have means for identifying the pairs each formed from a key image and from a pre-transformed image could nevertheless provide a displayable video content to the display device to which it is connected, since the insertion of pre-transformed images into the video content transmitted to the decoder would only slightly disrupt viewing.

The invention applies to any type of video content server and to any type of receiver, the decoder being only one type of receiver among others.

The invention claimed is:

1. A method comprising:
   receiving, via a receiver, a temporal succession of images forming a video content;
   detecting among the received images at least one pre-transformed image associated with another particular received image forming a received pair, wherein said particular received image is a key image and wherein any one pre-transformed image associated with the key image in a received pair is an image resulting from a color transformation of this key image;
   deriving, via at least one processor, from at least one received pair of a key image and its associated pre-transformed image, a color transform such that application of the derived color transform to the key image of said received pair generates said associated pre-transformed image;
   applying, via said at least one processor, each derived color transform to at least one received image having no associated pre-transformed images, and generating transformed images, then forming a temporal succession of transformed images.

2. The method according to claim 1, wherein each key image is associated with a plurality of pre-transformed images.

3. The method according to claim 2, adapted for displaying said video content using different types of display devices, wherein each pre-transformed image of said plurality results from a color transformation of its associated key image which is adapted to display said key image by one of said types of display devices.

4. The method according to claim 3, further comprising:
identifying at least one type of display device with which it is desired to display said video content, and
in order to perform said derivation of said color transform from each key image and one associated pre-transformed image of said plurality, selecting beforehand the pre-transformed image to be associated with said key image in said plurality according to said identified type of display device.

5. The method for displaying a video content comprising displaying transformed images obtained by the method of claim 4 and said selected pre-transformed images.

6. The method according to claim 1, wherein at least one base image which is associated with a key image is the base image(s) to be color transformed in the same way as this key image.

7. A system for image processing comprising:
a video content receiver for receiving at least a first base image from a display device of a defined type, said video content receiver having a processor configured to:
receive a temporal succession of base images via a receiver;
detect among the received images a pre-transformed image associated with a particular received base image, wherein said particular base image is a key image;
derive, via said at least one processor, from any received pair of key images and their associated pre-transformed images, a color transform such that application of the derived color transform to any of said key images generates said associated pre-transformed image;
apply, via said at least one processor, each color transform to at least one base image having no associated pre-transformed images, and generating transformed images, then forming a temporal succession of transformed images.

8. The system of claim 7, wherein said processor is further configured to: identify type Ti of each display device to which said receiver is connected;
transmit an information representative of said type identification to a server;
detect, among images of the received video content, images called key images Im_Kj, and, with each key image detected, detect an associated pre-transformed image for each identified type of display device, wherein each pre-transformed image is an image resulting from the color transformation of its associated key image for this display device;
for each pair formed by one Im_Kj of said key images and one Im_Vji of said associated pre-transformed image for each identified type Tj of display device, deriving a color transform Trji capable of transforming this key image Im_Kj into this pre-transformed image Im_Vji; and applying each derived color transform Trji to each of the received images which are associated with said key image Im_Kj and which are different from this key image Im_Kj, so as to obtain transformed images related to said identified type Ti of display device;
send to each display device of a type $T_i$ connected to the receiver a modified video content comprising the obtained transformed images which are related to said type $T_i$ of said display device and the pre-transformed images for said type $T_i$ of said display device.

* * * * *